United States Patent
Gaufres et al.

(10) Patent No.: US 10,820,610 B2
(45) Date of Patent: Nov. 3, 2020

(54) INGREDIENTS FOR ANIMAL FEED COMPOSITIONS

(71) Applicant: DEINOVE, Grabels (FR)

(72) Inventors: Laure Gaufres, Aiguesvives (FR); Patrick Hivin, Saint Jean de Védas (FR); Michael Krel, Paris (FR); Jean-Paul Leonetti, Montpellier (FR)

(73) Assignee: DEINOVE, Grabels (FR)

( * ) Notice: Subject to any disclaimer, the term of this patent is extended or adjusted under 35 U.S.C. 154(b) by 655 days.

(21) Appl. No.: 14/366,295

(22) PCT Filed: Dec. 18, 2012

(86) PCT No.: PCT/EP2012/076046
§ 371 (c)(1),
(2) Date: Jun. 18, 2014

(87) PCT Pub. No.: WO2013/092645
PCT Pub. Date: Jun. 27, 2013

(65) Prior Publication Data
US 2015/0010671 A1 Jan. 8, 2015

Related U.S. Application Data

(60) Provisional application No. 61/577,222, filed on Dec. 19, 2011.

(30) Foreign Application Priority Data

Dec. 19, 2011 (EP) .................................. 11306700

(51) Int. Cl.
| | | |
|---|---|---|
| *A23K 10/16* | (2016.01) | |
| *A23K 10/18* | (2016.01) | |
| *A23K 10/12* | (2016.01) | |
| *A23K 50/80* | (2016.01) | |
| *A23K 10/37* | (2016.01) | |
| *A23K 20/147* | (2016.01) | |
| *A23K 50/10* | (2016.01) | |
| *A23K 10/26* | (2016.01) | |
| *A23K 10/30* | (2016.01) | |
| *A23K 50/30* | (2016.01) | |
| *A23K 20/00* | (2016.01) | |
| *A23K 50/75* | (2016.01) | |
| *A23K 10/32* | (2016.01) | |

(52) U.S. Cl.
CPC .............. *A23K 10/12* (2016.05); *A23K 10/18* (2016.05); *A23K 10/26* (2016.05); *A23K 10/30* (2016.05); *A23K 10/32* (2016.05); *A23K 10/37* (2016.05); *A23K 20/00* (2016.05); *A23K 20/147* (2016.05); *A23K 50/10* (2016.05); *A23K 50/30* (2016.05); *A23K 50/75* (2016.05); *A23K 50/80* (2016.05); *Y02A 40/818* (2018.01); *Y02P 60/87* (2015.11)

(58) Field of Classification Search
CPC ........ A23K 10/10; A23K 10/12; A23K 10/16; A23K 10/18; A23K 30/15; A23K 50/75; A23K 50/80
USPC ............................................................ 426/2
See application file for complete search history.

(56) References Cited

U.S. PATENT DOCUMENTS

| | | | | |
|---|---|---|---|---|
| 5,047,332 A | * | 9/1991 | Chahal ..................... | C12N 1/22 426/53 |
| 6,410,305 B1 | * | 6/2002 | Miller ...................... | A01K 1/01 210/611 |
| 2013/0064927 A1 | * | 3/2013 | Davis ....................... | C12N 1/20 426/61 |

FOREIGN PATENT DOCUMENTS

| | | |
|---|---|---|
| CN | 101326960 | 12/2008 |
| CN | 101680015 | 3/2010 |
| EP | 2 218 773 | 8/2010 |
| JP | 52-136775 | 11/1977 |
| WO | WO 97/10352 | 3/1997 |
| WO | WO2008/108674 | 9/2008 |
| WO | WO 2009/063079 | 5/2009 |
| WO | WO 2011/107506 | 9/2011 |

OTHER PUBLICATIONS

Karlin, S. et al. PANS. 98: 5240-5245 (2001).*
Villa-Boas, S. G. et al. Animal Feed Sci. Technol. 98: 1-12 (2002).*
CN-10-262-618—English Abstract (Year: 2012).*
Weon, H.Y. et al. "*Deinococcus cellulosilyticus* sp. nov., isolated from air" *International Journal of Systematic and Evolutionary Microbiology*, Aug. 1, 2007, pp. 1685-1688, vol. 57, Part 8.
Written Opinion in International Application No. PCT/EP2012/076046, dated Jun. 11, 2013, pp. 1-6.
Ito, H. et al. "Isolation and Identification of Radiation-resistant Cocci Belonging to the Genus *Deinococcus* from Sewage Sludges and Animal Feeds" *Agric. Biol. Chem.*, 1983, pp. 1239-1247, vol. 47, No. 6.

(Continued)

*Primary Examiner* — Hamid R Badr
(74) *Attorney, Agent, or Firm* — Saliwanchik, Lloyd & Eisenschenk (57) ABSTRACT

The present invention relates to ingredients for animal feed compositions for enhancing animal growth and/or animal health. The invention also relates to methods for producing such ingredients and feed compositions. The methods of the invention further allow improving the palatableness and/or digestibility of feed compositions. More specifically, the invention describes the use of a mix of *Deinococcus* or related bacteria and biomass as a supply of organic constituents in feed compositions.

8 Claims, 2 Drawing Sheets
Specification includes a Sequence Listing.

(56) References Cited

OTHER PUBLICATIONS

Nunes, A. J.P. et al. "Practical supplementation of shrimp and fish feeds with crystalline amino acids" *Aquaculture*, 2014, pp. 20-27, vol. 431.
Klasing, K. C. "Nutritional Requirements of Poultry" 2015, *Merck Manual Veterinary Manual*, pp. 1-8.

* cited by examiner

Figure 1

*Enz = Cellulase+β-Glucosidase added in the culture at T0
0,11g of cellulase/g of cellulose
0,05g of β-Glucosidase/g of cellulose

INGREDIENTS FOR ANIMAL FEED COMPOSITIONS

CROSS-REFERENCE TO RELATED APPLICATIONS

This application is the U.S. national stage application of International Patent Application No. PCT/EP2012/076046, filed Dec. 18, 2012, which claims the benefit of U.S. Provisional Patent Application No. 61/577,222, filed Dec. 19, 2011.

FIELD OF THE INVENTION

The present invention relates to ingredients for animal feed compositions for enhancing animal growth and/or animal health. The invention also relates to methods for producing such ingredients and to feed compositions. The methods of the invention further allow improving the palatableness and/or digestibility of feed compositions. More specifically, the invention describes the use of a mix of *Deinococcus* or related bacteria and biomass as a supply of organic constituents in feed compositions.

BACKGROUND OF THE INVENTION

The feeding of livestock, such as pets, cattle, ovines, porcines, poultry, fish (including commercial and ornamental fish), and shrimp and other crustaceans, is a constant problem in the field of animal breeding and the agro-food industry. Because of the limited production facilities and lack of improvement in production technology, animal breeding is both costly and time-consuming. To improve the production and profitability of animal breeding, the most common solution is to provide industrial feed compositions, at least to complete the diet of the animals.

While feedstuffs are not of constant composition, several constituents are required to fulfill nutritional goals. Indeed, even if the biological response to the feed depends on the ability of the animal to derive useful nutrients from said feed, the feedstuffs used in the feeding generally comprise digestible proteins, lipids, carbohydrates and fiber.

Animal feed compositions are usually formulated with low-cost formulations. Of particular importance is the limited supply of digestible energy and the associated cost. The most costly nutrients are proteins and amino acids, including the essential amino acids. However, the production of animals that contain a significant rate of proteins would be necessary to proportionate the increase in world population.

The use of fish meal or meat and bone meal as protein raw material has been developed because of its low cost. Indeed, meat and bone meal is a product of the rendering industry that comprises about 50% protein and 8-12% fat. It is primarily used in the formulation of animal feed to improve the amino acid profile of the feed. However, the feeding of bone meal as protein to cattle is thought to have been responsible for the spread of mad cow disease. Consequently, in most parts of the world, the use of bone meal as a protein supply is no longer allowed in feed for ruminant animals.

Another raw material used for preparing feed compositions for ruminant animals is cellulosic material, which is a cheap and non direct valuable material. However, even if enzymes in ruminants allow the degradation of cellulose, several pre-treatments are performed to partially hydrolyze the cellulose and hemicellulose in order to help the further degradation by ruminant animals and enhance the digestibility of this raw material. For example, the addition of various exogenous enzymes, such as cellulases and hemicellulases, to the feedstuff comprising cellulosic material is useful to decrease polymer crystallinity and to increase access to the polymer backbone. In the same way, the thermochemical pre-treatment of the cellulosic material is also possible to partially hydrolyse the hemicellulose and cellulose portions.

Although these treatments improve carbohydrate digestibility and more generally the bio-availability of nutriments in the cellulosic material, they can be expensive and economically prohibitive. In addition, even if pre-treated, the cellulosic material is still indigestible and is therefore incapable of providing nourishment for non-ruminant animals, such as pigs and poultry. Furthermore, these treatments do not provide proteins, which are the most expensive constituent in animal feed compositions.

Consequently, there is a need for less expensive, safer and more nutritious food for commercial farm and battery animals, including both ruminant and non-ruminant animals, commercial fish and shrimp aquaculture, and pets.

SUMMARY OF THE INVENTION

The present invention relates to mixes of *Deinococcus* or related bacteria and biomass, such as animal, vegetal and/or algal biomass, and the use thereof in animal feeding, e.g., as part of animal feed compositions. The invention also relates to a method of preparing feedstuff using biomass and *Deinococcus* or related bacteria as feedstock. The invention also relates to methods for increasing the nutritive value, palatableness, or digestibility of biomass. The compositions and methods of the invention are suitable for nourishment of any animal, including, preferably, livestock (including ruminants and non-ruminants), breeding animals, avian animals, fishes or companion animals.

The inventors have discovered that *Deinococcus* or related bacteria in combination with non-usable raw materials, such as lignocellulosic biomass, can be used as a safe and low-cost nutriment for animals. Both ingredients cooperate to produce high-value feedstuff. Both the biomass and the *Deinococcus* bacteria are transformed, by the invention, from low-nutritive-value products into useful feedstuff ingredients. The invention shows that *Deinococcus* bacteria may be used in feedstuff, are safe and contain valuable nutritive agents. The invention also shows that biomass serves as a growing medium for *Deinococcus* bacteria, thereby allowing their expansion and enrichment, while the *Deinococcus* bacteria are able to digest the biomass, thereby converting the biomass into high-nutritive-value products with better digestibility. The feedstuff ingredients according to the invention therefore include organic (e.g., proteins, amino acids, sugars) and inorganic (e.g., minerals) compounds which are utilized in the normal metabolism of animals and fish and provide essential nutrients that are not synthesized or not synthesized in sufficient amounts, such as essential amino acids.

Therefore, an object of the invention relates to an ingredient for feedstuff comprising a mix of biomass and a *Deinococcus* or related bacterium, said biomass being at least partially digested by said *Deinococcus* or related bacterium.

The invention also relates to the use of a mix of biomass and a *Deinococcus* or related bacterium to prepare a feedstuff.

The invention also relates to a feedstuff composition comprising an ingredient as defined above. Typically, the feedstuff composition comprises at least 10% by weight of said ingredient. The feedstuff composition may further comprise additional ingredients such as, without limitation, alfalfa, barley, blood meal/meat meal, fat animal poultry, potato waste, or tomato waste.

A further object of this invention relates to the use of a composition comprising a biomass and *Deinococcus* or related bacteria for animal feeding.

A further object of this invention relates to the use of a mix of biomass and *Deinococcus* or related bacteria, said biomass being at least partially digested by said *Deinococcus* or related bacteria, as an ingredient for feedstuff.

A further object of this invention relates to the use of a mix of biomass and *Deinococcus* or related bacteria, said biomass being at least partially digested by said *Deinococcus* or related bacteria, as a protein supply for feedstuff. As further illustrated in the examples, *Deinococcus* bacteria are themselves a high source of proteins and, in addition, they hydrolyse proteins of biomass, therefore providing available amino acids.

The invention also relates to the use of *Deinococcus* bacteria as a source of amino acids for animal feeding.

The invention also relates to a method for preparing a feedstuff, comprising:
  submitting a biomass to at least partial digestion by *Deinococcus* or related bacteria, and
  formulating a mix of at least partially digested biomass and bacteria as an ingredient for feedstuff.

In a particular embodiment, the method comprises a further step of adding to the mix other ingredients commonly used for feedstuff.

In an alternative embodiment, the method comprises:
  (a) combining a biomass and *Deinococcus* or related bacteria to obtain a mix,
  (b) maintaining the mix under conditions allowing digestion of the biomass by said *Deinococcus* or related bacteria,
  (c) collecting the mix of (a) or (b), and
  (d) optionally mixing the mix of (c) with one or several further ingredients.

The feedstuff may be packaged in any suitable form or container.

The biomass for use in the invention may comprise vegetal biomass, animal biomass and/or algal biomass. In a particular embodiment, the biomass is a lignocellulosic biomass. In another embodiment, the biomass is a protein-containing biomass. The digestion of the biomass may be performed in aerobic or anaerobic conditions, preferably in a reactor, for easily managing the reaction parameters (e.g., time of reaction, temperature, or feedstock quantities).

The invention also relates to a method for improving the nutritive value of a biomass, comprising subjecting said biomass to at least partial digestion by *Deinococcus* or related bacteria. Said method may further comprise a step wherein the nutritive value of said at least partially digested/hydrolyzed biomass is analysed or controlled.

A further object of this invention relates to a method for improving the palatableness and/or digestibility of a biomass, comprising subjecting said biomass to at least partial digestion by *Deinococcus* or related bacteria, in order to at least partially degrade the complex sugars of said biomass. Said method may further comprise a step wherein the degradation of the complex sugars is controlled.

The compositions and methods of the invention may be used as nutrients or nutrient additives for any animal, especially non-human mammals such as livestock (including ruminants and non-ruminants), breeding animals, companion animals, avian animals, or fishes.

DETAILED DESCRIPTION OF THE INVENTION

The invention relates, generally, to the use of *Deinococcus* or related bacterial strains to produce animal feed or additives with biomass. More particularly, the invention provides a low-cost and high-level supply for proteins and amino acids, based on the growth of *Deinococcus* bacteria and degradation/transformation of the biomass. The mix of *Deinococcus* or related bacteria and a biomass according to the invention may be used to provide animals a low-cost and/or high-level source of valuable mono- and di-acids or any metabolites derived from these mono- or di-acids, derived from sugars such as xylan or hemicellulose hydrolysate contained in the biomass. According to the invention, unprocessed material of biological origin, including vegetal, algal or animal biomass, or secondary biomass, which essentially contains hydrolysed pre-treated biomass products, may be used in combination with *Deinococcus* bacteria as a nourishing/nutritive feedstock, animal feed or additive.

It is therefore an object of the invention to provide an ingredient for feedstuff comprising a mix of biomass and *Deinococcus* or related bacteria, said biomass being at least partially digested by *Deinococcus*.

A further object of this invention relates to the use of a composition comprising a biomass and *Deinococcus* or related bacteria, for animal feeding.

Definitions

The term "biomass" according to the invention typically designates any biological material. In particular, the term biomass includes organic material of biological origin, including vegetal, algal or animal origin, which may be unprocessed or pre-treated. Examples of biomass include, without limitation, forestry products, including mature trees unsuitable for lumber or paper production, pulp, recycled paper, organic waste, agricultural products, such as grasses, straw, crops and animal manure, and aquatic products, such as algae and seaweed. Examples of biomass include wood or vegetal material derived from numerous types of plants, including *miscanthus*, hemp, switchgrass, sugarbeet, wheat, barley, corn, rice, soy, rapeseed (including canola), sorghum, sugarcane, peanut, cotton, lupine, and a variety of tree species ranging from *eucalyptus* to oil palm, poplar, and willow. Specific sources of biomass include, without limitation, plant residues, hardwood or softwood stems, cobs, straw, grass, leaves, seeds, paper, etc. (see, for instance, Sun et al., Bioresource Technology 83 (2002) 1-11). The term biomass also encompasses transformed biomass or secondary biomass, which essentially contains hydrolysed pretreated biomass products. In a preferred embodiment, biomass according to the invention comprises any lignocellulosic material, for example, cellulose, hemicelluloses and/or xylan.

The biomass according to the invention may comprise raw biomass and/or secondary biomass. The "raw biomass" is unprocessed material from biological matter. Examples include, without limitation, forestry products, such as mature trees unsuitable for lumber or paper production, agricultural products, such as grasses, crops and animal manure, and aquatic products, such as algae and seaweed. The "secondary biomass" is any material initially derived from raw biomass which has undergone significant chemical and physical changes. Examples include, without limitation, paper, leather, cotton, hemp, natural rubber products, food processing by-products, fish and animal meals, and used cooking oils.

The term "lignocellulosic biomass" according to the invention designates an organic biological material containing lignin, cellulose, hemicellulose and/or xylan. The term lignocellulosic biomass generally designates unprocessed material of biological origin, e.g., raw biomass. Examples of lignocellulosic biomass include, without limitation, wood or vegetal material derived from numerous types of plants, including *miscanthus*, rapeseed, switch grass, hemp, sugarbeet, wheat, wheat straw, corn, poplar, willow, sorghum, sugarcane, and a variety of tree species ranging from *eucalyptus* to oil palm.

As used herein, the term "biomass derivatives" designates all molecules derived from raw biomass and/or from secondary biomass, as defined above.

In the context of the present application, the term "*Deinococcus* bacterium" includes wild-type bacteria, or natural variant strains of *Deinococcus*, e.g., strains obtained through accelerated evolution by DNA-shuffling technologies, as well as recombinant strains obtained by insertion of eukaryotic, prokaryotic and/or synthetic nucleic acid(s).

A bacterium "related" to *Deinococcus* designates a bacterium which (i) contains a 16S rDNA which, upon amplification using primers GTTACCCGGAATCACTGGGCGTA (SEQ ID NO: 1) and GGTATCTACGCATTCCACCGCTA (SEQ ID NO: 2), generates a fragment of about 158 base pairs and/or (ii) resists a UV treatment of 4 mJ/cm$^2$. In a particular embodiment, *Deinococcus*-related bacteria are bacteria having a 16S rDNA molecule which is at least 70%, preferably at least 80%, identical in sequence to a *Deinococcus* 16S rDNA sequence.

In the context of the invention, "proteins" mean all biochemical compounds comprising one or more polymer chain(s) of amino acids residues bonded together. The protein supply of the invention includes proteins, peptides, polypeptides, amino acids and related derivatives.

In the context of the invention, an "exogenous component", such as an "exogenous protein", refers to a component originating from the biomass or a culture medium and, conversely, an "endogenous component" refers to a component originating from the bacterium.

In the context of the invention, "starch" refers to a carbohydrate consisting of a large number of glucose units joined together by 1-4 and 1-6 glycosidic bonds. Starch is an energy storage molecule accumulated by many plants and bacteria, and starch molecules arrange themselves in the plant in semi-crystalline granules.

Digestion of the Biomass by the Bacteria to Produce High-Value Feedstuff

The present invention is based, inter alia, on the combination of biomass and *Deinococcus* or related bacteria which cooperate to generate high-nutritive-value and high-digestibility products suitable for feedstuff. The invention shows that biomass supports the growth and expansion of the bacteria, increasing the nutritive value of the mix, while the bacteria are able to digest the biomass, further increasing the nutritive value, digestibility and palatebleness of the mix.

According to the invention, the biomass may be at least partially digested by the *Deinococcus* and/or related bacteria.

The term digested or digestion includes all biological modification or transformation of the biomass, such as degradation or hydrolysis of components of the biomass such as raw material, cell walls, polymers (e.g., sugars, proteins), etc. Digestion may be partial, meaning that only a portion of some of the components of the biomass is digested, typically 5%, 10%, or more. Partial digestion indicates that at least part of the biomass has been modified or transformed, which typically results in increased nutritive value, digestibility or palatableness.

*Deinococcus* or related bacteria may advantageously catalyze (or contribute to the catalysis of) the degradation of various components of a biomass, such as sugar polymers like starch, xylan or cellulose, into oligosaccharides of smaller degree of polymerization and monosaccacharides. Indeed, *Deinococcus* bacteria which express particular enzymes and/or have the ability to transform raw biomass have been disclosed in the art by Applicant. In this regard, preferred *Deinococcus* bacteria for use in the invention synthezise xylanases, cellulases and/or amylases. Xylanases are enzymes that catalyze the hydrolysis of xylan, a major component of hardwood and softwood hemicelluloses. Amylases are involved in the hydrolysis of starch polymers. Cellulases are enzymes that catalyze the hydrolysis of cellulose or hemicellulose, a major component of hardwood and softwood.

In a particular embodiment, the digestion of the biomass designates a reduction in the level of cellulose or hemicellulose of the biomass, preferably a reduction by at least 5%. Such a decrease facilitates the digestibility of the biomass by all kinds of animals, including non-ruminant animals.

In a preferred embodiment, the digestion of the biomass designates the conversion of hemicellulose from said biomass into smaller oligosaccharides and/or xylose, mannose, arabinose or galactose, and/or the conversion of cellulose and/or starch from said biomass into glucose. Preferably, the digestion encompasses conversion of at least 5% hemicellulose, cellulose, or starch from said biomass.

Such at least partial digestion of the sugars improves the digestibility and/or palatableness of the biomass, since C5 sugars like xylose, which cause the non appetence of the substrate, are digested by *Deinococcus* (Br J Nutr., 2010 May, 103(10):1507-13).

In another embodiment, digestion comprises cellular sugar oxidation, particularly including DP3-DP7 sugars (DP: degree of polymerization), e.g., triose, tetrose, pentose, hexose, and heptose, for example selected from xylose, arabinose, glucose, galactose, or fucose residues as monomers.

Simultaneously to the degradation/digestion of the biomass, the growth of the bacteria increases. Consequently, because the level of bacteria increases inside the mix, the level of proteins and lipids increases too. Then, according to the invention, the digestion of the biomass by *Deinococcus* or related bacteria, even indigestible biomass such as wheat bean or canola seed cattle cakes, provides a high level of directly nourishing constituents for animals. The invention allows making the most of several vegetal biomasses that were not used for animal feeding because of their indigestibility and/or low levels of nutriments. It is, for example, the case for rapeseed cattle cakes, which contain a low level of proteins compared to soybean cattle cakes. Such biomass comprises 1 to 6 g/l of vegetal proteins and no significant amount of lipids. After partial digestion of said biomass by *Deinococcus* or related bacteria according to the invention, one may expect about 12 to 25 g/l of proteins and about 1 to 2.5 g/l of lipids. In the same way, several animal biomasses without industrial interest, such as poultry feathers, may be advantageously used as biomass to be mixed with *Deinococcus* for providing animal feedstuff ingredient.

In addition, since *Deinococcus* sp. naturally produce carotenoids, the biomass/*Deinococcus* mix of the invention may contain carotenoids which have a positive impact on both the visual and gustative quality and the health of the animals fed with said mix. For example, based on a vegetal biomass without any carotenoids, one may expect about 15 mg/kg of carotenoids in the mix after the partial digestion of the vegetal biomass and the growth of the bacteria.

The final amount of proteins, amino acids, lipids, vitamins, carotenoids, etc. produced or synthesized by *Deinococcus* and recovered in the mix will depend on several industrial parameters, such as the nature and the conditions of the reaction, the time of reaction, the initial amount of bacteria and the kind of biomass used. It will be apparent to one skilled in the art that various adaptations can be made to adapt the method of the invention to the need.

For example, the digestion level of the biomass may vary depending on the industrial/economic and/or nutritive requirements. If a high level of nutritive constituents is preferred to a low-cost production, the time of reaction may be increased for allowing a complete digestion of the biomass. In the final mix, one may expect a lack of vegetal fraction, the bacteria having almost totally digested the biomass. Conversely, a low-cost ingredient, with a minimum level of proteins, can be desired. The balance between the time of reaction and the level of nutritive constituents may be easily adapted.

The mix of the invention, or final mix, comprises the remaining biomass (the part of the biomass which has not been hydrolyzed/digested by the bacteria) and *Deinococcus* or related bacteria, whose number has increased.

In an embodiment of the invention, the *Deinococcus* or related bacterium used presents a proteoloytic activity, particularly useful to at least partially hydrolyse proteins contained in the biomass.

Proteases, also known as proteinases or proteolytic enzymes, are enzymes that begin protein catabolism by hydrolysis of the peptide bonds that link amino acids together in the polypeptide chain.

The inventors have discovered that *Deinococcus* or related bacteria may present high proteolytic activity. According to the invention, *Deinococcus* or related bacteria having proteolytic activity may be advantageously used in combination with several vegetal, algal or animal biomasses containing proteins to provide highly digestible amino acids. The bacteria hydrolyze the proteins, providing amino acids and peptides that are easily absorbed by animals. The resulting mix may be used as an ingredient for feed composition that provides both exogenous amino acids (and/or peptides) and endogenous nutriments (from the bacteria themselves) including proteins and amino acids.

For example, *Deinococcus* bacteria may be contacted with algae such as *Micractinium pusillum* and/or *Chlorella* sp. so that the resulting mix may be used instead of fish meal as an ingredient for feedstuff containing useful amino acids.

Other examples of biomasses containing proteins include beet pulp, soybeans, alfalfa and chicken feathers.

The use of *Deinococcus* or related bacteria can also reduce the viscosity of biomass (vegetal, animal, or algal), which represents a further advantage. Indeed, the proteolytic activity of the *Deinococcus* or related bacteria reduces the viscosity of gelatin-containing biomass. Also, the pectinolytic activity of *Deinococcus* or related bacteria reduces the viscosity of pectin-containing biomass.

The inventors have discovered that *Deinococcus* or related bacteria may present high pectinolytic activity. According to the invention, *Deinococcus* or related bacteria synthesizing pectinases may be advantageously used in combination with a biomass containing pectin to decrease its viscosity and thus increase its palatableness. The bacteria hydrolyze the pectin, eliminating the viscous properties of the biomass. Such viscous biomass may be used as a growing medium for *Deinococcus* or related bacteria, and the resulting mix may be used as an ingredient for feedstuff.

In a particular embodiment of the invention, the *Deinococcus* or related bacterium used in the mix for feedstuff therefore presents pectinolytic activity, particularly useful to at least partially hydrolyse pectin contained in some viscous biomass.

It is the case, for example, of beet pulp that contains a high level of pectin (15 to 20% by weight). The beet pulp is a feedstock that is not easily exploitable because of the pectin making this biomass viscous. It is not possible to feed animals directly with such viscous biomass and its use in pleasant feed requires costly treatments.

In one embodiment, the viscous biomass is only part of the biomass of the mix. For example, the used biomass comprises 60% of lignocellulosic biomass, such as canola seed cattle cake, and 40% of viscous biomass, such as beet pulp.

Process for Preparing the Mix

The digestion of the biomass by *Deinococcus* or related bacteria may be advantageously conducted in a reactor, for managing the parameters of the reaction easily. Depending on the strain(s) of bacteria and/or the biomass used, the reaction may be conducted in an aerobic or anaerobic reactor.

In one embodiment, the biomass is introduced at one time, together with the bacteria. In another embodiment, the reactor may be reloaded with biomass or bacteria during the process. In such case, the nature and quantity of biomass may vary to improve the final content of nutrients in the final mix. The final mix comprises the remaining biomass, which has not been hydrolyzed/digested yet, the products resulting from hydrolysis/digestion (unless consumed by the bacteria), and the bacteria which have been expanded.

The amount of liquid added inside the reactor may depend on the form of the final composition, i.e., liquid or solid form, and the moisture content of the biomass.

In another embodiment, the preparation of the mix of the invention is conducted in open country. For example, the biomass and *Deinococcus* or related bacteria are first mixed together before being spread on the soil. This initial mix can be covered with a canvas sheet, or conversely the mix can be put in the fresh air.

According to the invention, the mix can be used directly as part of an animal feed composition. Otherwise, the mix can be processed (for example, dehydrated, filtered, dried, milled, etc.) before being used. In another embodiment, the mix may be treated to kill or inactivate the bacteria, or to eliminate remaining raw biomass. The resulting product essentially comprises bacteria and digested biomass components and may be used as straight protein and lipid raw material.

The mix of biomass and *Deinococcus* or related bacteria according to the invention may be used as an ingredient in an animal feed composition. An animal feed composition as used herein is a composition for animal nutrition, in solid or liquid form. The feed may be defined as a substance with sufficient nutritional value to allow growth and maintenance of adequate body condition in an animal. For example, an animal feed composition may be in the form of pellets, meal, grains, extruded or expanded grains, tablets, powder, bolus or a mix thereof.

Preferentially, the animal feed composition of the invention, including the mix of bacteria and biomass, is in a form and/or a composition approved by a governmental institution such as National Food Administration (for example, the AFSSA in France, ACIA in Canada, or FDA in the US).

In a preferred embodiment, the animal feed composition of the invention comprises at least 10% by weight of the mix of *Deinococcus* or related bacteria and at least partially digested/hydrolyzed biomass. Depending on the other ingredients used to form the animal feed composition, and their impact on both the physical quality of the feed after forming (such as pelleting) and the nutritional quality required, the level of the mix of the invention may be increased or decreased. For example, to obtain pellets with a good quality standard in terms of hardness and durability, an amount of about 40% of pre-gelatinized starch may be added. If native starch is used, the required amount may be higher. In the same way, the amount of dispersible protein may also positively affect hardness and durability properties of pelleted feeds.

In this regard, the invention also relates to a method for preparing a feedstuff, comprising:
submitting a biomass to at least partial digestion by *Deinococcus* or related bacteria, and
formulating a mix of at least partially digested biomass and bacteria as an ingredient for feedstuff.

In a particular embodiment, the method comprises a further step of adding to the mix other ingredients commonly used for feedstuff.

In an alternative embodiment, the method comprises:
(a) combining a biomass and *Deinococcus* or related bacteria to obtain a mix,
(b) maintaining the mix under conditions allowing digestion of the biomass by said *Deinococcus* or related bacteria,
(c) collecting the mix of (a) or (b), and
(d) optionally mixing the mix of (c) with one or several further ingredients.

The feedstuff may be packaged in any suitable form or container.

In the mix, it is possible to use one species or strain of a *Deinococcus* or related bacterium, or to combine various strains, or the same or distinct species of *Deinococcus* bacteria. Also, in addition to *Deinococcus* or related bacteria, the mix or feedstuff product may further comprise bacteria or yeast cells, if appropriate. Furthermore, additional agents such as enzymes may be added to the biomass.

As indicated above, the invention may be used to produce feedstuff or feed additives suitable for use in any non-human animals. It is particularly suitable for livestock (including ruminants and non-ruminants), breeding animals, avian animals, fishes or companion animals. Specific examples include cattle, ovines, porcines, poultry, fish, and shrimp and other crustaceans.

Further aspects and advantages of the invention will be disclosed in the following Examples section, which should be considered as illustrative of the invention.

EXAMPLES

Example 1: Identification of Mesophilic and Thermophilic *Deinococcus* Strains with Biomass-Degrading Activities This example discloses tests suitable to determine whether a genus, species and/or bacterial strain is able to function in a method for preparing feedstuff according to the invention. Non-limitative examples of tests that may be performed to identify bacteria exhibiting particular enzymatic activities are described below.
Materials and Methods
Complex Medium Glucose (CMG) 1% composition
Peptone: 2 g/L
Yeast extract: 5 g/L
Autoclavation 121° C., 15 min.
Glucose: 10 g/L—Filter sterilized (0.22 μm)
Then addition of MOPS, micronutrients, vitamins, $FeCl_3$, $K_2HPO_4$ (see below)
Media Composition (MM)
14 g/L of agar are added to 704 ml of ultrapure water. Then an autoclavation is performed. Then, after medium cooling, 80 ml of MOPS 10×, 8 ml of $FeCl_3$ 100×, 8 ml of $K_2HPO_4$ 100×, 80 μL of micronutrients 10,000×, and 80 μL of vitamins 10,000× are added.
Media Composition for Solid Screening of Cellulolytic Activity (5% Azo-Cellulose)
14 g/L of agar are added to 704 ml of ultrapure water. Then an autoclavation is performed. Then, after medium cooling, 80 ml of MOPS 10×, 8 ml of $FeCl_3$ 100×, 8 ml of $K_2HPO_4$ 100×, 80 μL of micronutrients 10,000×, and 80 μL of vitamins 10,000× are added.
Finally, Azo-cellulose solution at 5% is added.
Media Composition for Solid Screening of Proteolytic Activity (1% Milk)
10 g/L of milk powder and 14 g/L of agar are added to 704 ml of ultrapure water. Then an autoclavation is performed. Then, after medium cooling, 80 ml of MOPS 10×, 8 ml of $FeCl_3$ 100×, 8 ml of $K_2HPO_4$ 100×, 80 μL of micronutrients 10,000×, and 80 μL of vitamins 10,000× are added.
Media Composition for Solid Screening of Amylolytic Activity (0.5% Starch)
5 g/L of starch and 14 g/L of agar are added to 704 ml of ultrapure water. Then an autoclavation is performed. Then, after medium cooling, 80 ml of MOPS 10×, 8 ml of $FeCl_3$ 100×, 8 ml of $K_2HPO_4$ 100×, 80 μL of micronutrients 10,000×, and 80 μL of vitamins 10,000× are added.
Media Composition for Solid Screening of Xylanolytic Activity (5% Azo-Xylan)
14 g/L of agar are added to 704 ml of ultrapure water. Then an autoclavation is performed. Then, after medium cooling, 80 ml of MOPS 10×, 8 ml of $FeCl_3$ 100×, 8 ml of K$_2$HPO$_4$ 100×, 80 μL of micronutrients 10,000×, and 80 μL of vitamins 10,000× are added.

Finally, Azo-xylan solution at 5% is added.
MOPS-buffer mixture 10×, pH 7.0

| | |
|---|---|
| MOPS acid | 400 mM |
| NH$_4$Cl | 200 mM |
| NaOH | 100 mM |
| KOH | 100 mM |
| CaCl$_2$ | 5 μM |
| Na$_2$SO$_4$ | 2.76 mM |
| MgCl$_2$ | 5.28 mM |

Filter sterilized (0.22 μm)
Micronutrients 10,000×

| | |
|---|---|
| (NH$_4$)$_6$(Mo$_7$)O$_{24}$ | 30 μM |
| H$_3$BO$_3$ | 4 mM |
| CoCl$_2$ | 300 μM |
| CuSO$_4$ | 100 μM |
| MnCl$_2$ | 2.5 mM |
| ZnSO$_4$ | 100 μM |

Adjusted to pH 5 with HCl
Filter sterilized (0.22 μm)
Vitamins 10,000×
10 mg/L of each: D-biotin, niacin (nicotinic acid), pyridoxine (pyroxidal hydrochloride) B6, thiamine (vitamin B1 hydrochloride); stock pH4; filter sterilized (0.22 μm)
FeCl$_3$ 100×
2 mM FeCl$_3$ in 2 mM sodium citrate; filter sterilized (0.22 μm)
K$_2$HPO$_4$ 100×
100 g/L, autoclaved Detection of Enzymatic Activities
Detection of Cellulolytic Activity
Solid Screening (Test on Agar Plate)

A preculture was carried out in CMG 1% medium in microplate using isolated clones (5 colonies in 200 μL of CMG 1% medium).

From a stationary phase, 5 μL of preculture were spotted on agar plates containing MINI and 5% Azo-cellulose.

The cellulolytic enzymatic activity was followed by measuring the hydrolysis halo diameter after 1, 2 and 5 days (1 plate/day was required).

Liquid Screening

A preculture was carried out in CMG 1% medium in microplate using isolated clones (5 colonies in 200 μL of CMG 1% medium).

From a stationary phase, 5 μL of preculture were added to 200 μl MM+1% CMC, 1% CMC4M or 1% cellobiose in microplates.

The cellulolytic enzymatic activity was estimated by following the growth at OD$_{600\ nm}$ (reading twice a day for 5 days).

Detection of Proteolytic Activity
Solid Screening (Test on Agar Plate)

A preculture was carried out in CMG 1% medium in microplate using isolated clones (5 colonies in 200 μL of CMG 1% medium).

From a stationary phase, 5 μL of preculture were spotted on agar plates containing MM and 1% milk.

The proteolytic enzymatic activity was followed by measuring the hydrolysis halo diameter after 1, 2 and 5 days (1 plate/day was required).

Liquid Screening

A preculture was carried out in CMG 1% medium in microplate using isolated clones (5 colonies in 200 μL of CMG 1% medium).

From a stationary phase, 5 μL of preculture were added to 200 μl MM+1% peptone or 1% casein in microplates.

The proteolytic enzymatic activity was estimated by following the growth at OD$_{600\ nm}$ (reading twice a day for 5 days).

Detection of Amylolytic Activity
Solid Screening (Test on Agar Plate)

A preculture was carried out in CMG 1% medium in microplate isolated clones (5 colonies in 200 μL of CMG 1% medium).

From a stationary phase, 54, of preculture were spotted on agar plates containing MINI and 0.5% starch.

The amylolytic enzymatic activity was followed by measuring the hydrolysis halo diameter after 1, 2 and 5 days (1 plate/day was required).

On starch-containing-agar plates, the hydrolysis halo revelation was done by addition of Gram's iodine reagent (1 plate/day was also required).

Liquid Screening

A preculture was carried out in CMG 1% medium in microplate using isolated clones (5 colonies in 2004, of CMG 1% medium).

From a stationary phase, 54, of preculture were added to 200 μl MM+0.5% starch in microplates.

The amylolytic enzymatic activity was estimated by following the growth at OD$_{600\ nm}$ (reading twice a day for 5 days).

Detection of Xylanolytic Activity
Solid Screening (Test on Agar Plate)

A preculture was carried out in CMG 1% medium in microplate using isolated clones (5 colonies in 2004, of CMG 1% medium).

From a stationary phase, 54, of preculture were spotted on agar plates containing MM and 5% Azo-xylan.

The xylanolytic enzymatic activity was followed by measuring the hydrolysis halo diameter after 1, 2 and 5 days (1 plate/day was required).

Liquid Screening

A preculture was carried out in CMG 1% medium in microplates using isolated clones (5 colonies in 2004, of CMG 1% medium).

From a stationary phase, 54, of preculture were added to 200 μl MM+0.5% xylan in microplates.

The xylanolytic enzymatic activity was estimated by following the growth at OD$_{600\ nm}$ (reading twice a day for 5 days).

Results

Table 1 (below) lists examples of bacteria identified with solid screening tests and having suitable biomass-digestion activity for use in feedstuff production.

The hydrolysis halo diameter was measured after 2 days for the proteolytic and amylolytic activities, and after 5 days for the xylanolytic and cellulolytic activities.

More precisely, for proteolytic activity, a high activity corresponds to a hydrolysis halo diameter higher than 2.4 cm, a medium activity corresponds to a hydrolysis halo diameter between 2 cm and 2.35 cm, and a low activity corresponds to a hydrolysis halo diameter lower than 1.95 cm.

For amylolytic activity a high activity corresponds to a hydrolysis halo diameter higher than 2.4 cm, a medium activity corresponds to a hydrolysis halo diameter between 2.1 cm and 2.35 cm, and a low activity corresponds to a hydrolysis halo diameter lower than 1.9 cm.

For xylanolytic activity a high activity corresponds to a hydrolysis halo diameter higher than 2.8 cm, a medium activity corresponds to a hydrolysis halo diameter between 2.1 cm and 2.7 cm, and a low activity corresponds to a hydrolysis halo diameter lower than 2.05 cm.

For cellulolytic activity a high activity corresponds to a hydrolysis halo diameter higher than 1.6 cm, a medium activity corresponds to a hydrolysis halo diameter between 1.1 cm and 1.35 cm, and a low activity corresponds to a hydrolysis halo diameter lower than 0.9 cm.

TABLE 1

List of *Deinococcus* strains having cellulolytic, proteolytic, amylolytic and/or xylanolytic activities (solid screening)

|  | 2 days Proteolytic activity | 2 days Amylolytic activity | 5 days Xylanolytic activity | 5 days Cellulolytic activity |
|---|---|---|---|---|
| DRH01 | +++ | +++ | − | − |
| DRH02 | ++ | − | − | − |
| DRH03 | ++ | + | − | − |
| DRH46 | ++ | + | − | +++ |
| M1-5A | +++ | +++ | − | + |
| M2-8F | ++ | ++ | − | − |
| M2-9H | ++ | + | − | − |
| M3-5A | + | ++ | − | +++ |
| M3-6B | + | ++ | − | +++ |
| M3-6G | + | ++ | − | ++ |
| M3-7C | ++ | + | − | + |
| DRH05 | + | + | − | − |
| DRH06 | + | ++ | − | − |
| DRH07 | + | + | + | − |
| DRH38 | + | + | +++ | − |
| DRH39 | + | − | + | − |
| M11-12B | + | + | − | − |
| M13-1A | + | − | − | − |
| M13-8D | + | + | − | − |
| M23-1G | ++ | ++ | − | − |
| M23-2A | +++ | ++ | − | − |
| M23-2E | +++ | ++ | − | − |
| M23-2F | ++ | ++ | − | − |
| M23-3A | ++ | +++ | +++ | − |
| M31-1H | ++ | ++ | − | − |
| M31-2A | +++ | +++ | − | − |
| M31-2B | +++ | ++ | − | − |
| M31-8F | ++ | ++ | − | − |
| M35-1F | ++ | − | + | − |
| DG01 | ++ | − | ++ | − |
| MC2-2A | ++ | − | +++ | − |
| MC3-4A | ++ | ++ | − | − |
| MC3-4B | +++ | − | +++ | − |
| MD2-3B | ++ | − | ++ | − |
| MD2-3B bis | + | − | + | − |
| MX4-2B | + | + | − | − |
| MX4-2D | + | + | − | − |
| MX4-4A | ++ | − | + | − |
| DG01_04 | ++ | ++ | ++ | − |
| MC5-12E | +++ | ++ | − | − |

(+++): high activity
(++): medium activity
(+): low activity
(−) no activity

Table 2 (below) lists examples of bacteria identified with liquid screening tests and having variable enzymatic activities for production of feedstuff. Growth of the bacteria is followed by measuring the OD at 600 nm.

TABLE 2

List of *Deinococcus* strains having cellulolytic, proteolytic, amylolytic and/or xylanolytic activities (liquid screening)

|  | 1% Casein | 0.5% starch | 0.5% xylan | 1% CMC4M |
|---|---|---|---|---|
| DRH01 | + | + | + | − |
| DRH22 | + | − | − | − |
| DRH25 | + | − | − | − |
| DRH46 | + | + | + | + |
| M3-5A | + | + | − | + |
| M3-6B | + | + | − | + |
| M3-6G | + | + | − | + |
| M4-9B | + | + | − | + |
| M5-1D | + | + | − | − |
| M5-5A | + | + | − | + |
| DRH05 | + | + | − | − |
| DRH06 | + | + | − | − |
| DRH37 | + | + | + | − |
| DRH38 | + | + | + | − |
| DRH39 | + | + | + | − |
| M11-12B | + | + | + | − |
| M13-1A | + | + | − | − |
| M23-2A | + | + | + | − |
| M23-3A | + | − | + | − |
| M31-3C | + | + | + | − |
| M31-3D | + | + | + | − |
| M31-8F | + | + | + | − |
| M35-1F | + | + | − | − |
| MC2-2A | + | − | + | − |
| MC2-2C | + | − | + | − |
| MC3-4A | + | + | + | − |
| MX4-2B | + | + | − | − |
| MX4-2D | + | + | + | − |

(+): good growth (OD$_{600\,nm}$ ≥0.5)
(−): low or no growth (OD$_{600\,nm}$ <0.5).

This example shows that *Deinoccocus* bacteria having suitable biological activity may be selected from public collections, and used in the invention to produce feedstuff.

Example 2: Production of a Rapeseed Straw-*Deinococcus* Mix

A mix of rapeseed straw and *Deinococcus* bacteria has been prepared. More particularly, 1% pretreated rapeseed straw has been contacted with a *Deinococcus* bacterium (e.g., strain DG01). The capacity of the mixture to produce a valuable mix for feedstuff has been determined by verifying the capacity of *Deinocossus* to expand and digest rapeseed straw, either alone or after enzymatic supplementation, and to produce high nutritive content.

Materials and Methods

Rapeseed Straw

Rapeseed straw was obtained from Sofiproteol and was ground in a blender and then passed through a sieve to obtain fine sections, less than 1 mm in length.

Cellulase and β-Glucosidase

The commercial enzymes used were a cellulase from *Trichoderma reesei* (Sigma, ref. C8546-5KU) and a beta-glucosidase from almonds (Sigma, ref 49290-1G).

$H_2SO_4$ Hydrothermal Pre-Treatment

Pre-treatment was performed in an Erlenmeyer flask with 20% w/v rapeseed straw and 0.5% w/w $H_2SO_4$ in tap water. This mixture was autoclaved 10 min at 120° C. (time of cycle: 1.5 h) and then diluted with sterile tap water to obtain the final rapeseed straw concentration. pH was adjusted to 7 with 20M NaOH solution (checked with pH paper). Mineral solutions: 20 mM $NH_4Cl$ and 5.7 mM $K_2HPO_4$ were added before inoculation.

Figure 1:
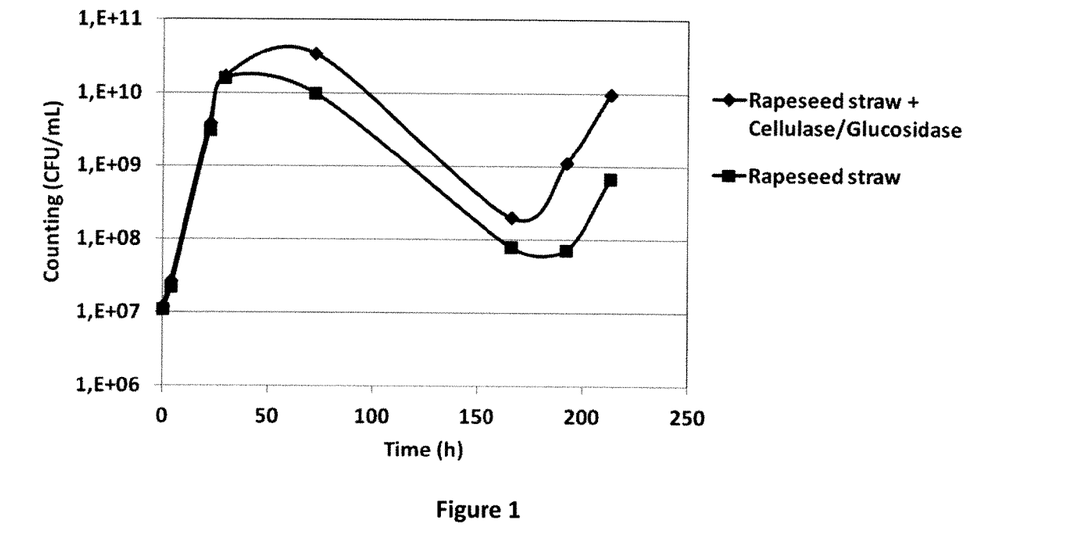
FIG. 1: Growth of strain DG01 (*D. geothermalis* 01) on 1% pre-treated rapeseed straw with or without addition of cellulase and β-glucosidase.
Figure 2:
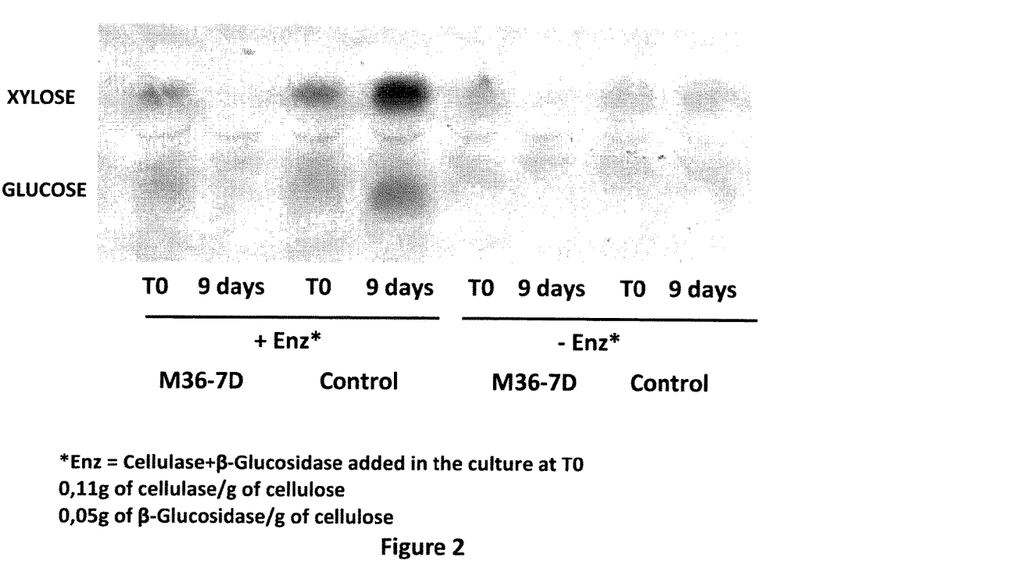
FIG. 2: TLC analysis showing consumption of xylose and glucose removed from 1% pre-treated rapeseed straw inoculated with DG01. Control consists of the pre-treated rapeseed straw without bacteria. Enzymes are added at T0 in the culture (0.11 g of cellulase/g of cellulose and 0.05 g of β-glucosidase/g of cellulose). The total enzymatic hydrolysis is performed using 1.1 g of cellulase/g of cellulose, 0.5 g of β-glucosidase/g of cellulose and 5.5 g of xylanase/g of hemicellulose.

Counting Protocol
Take 1 mL of homogeneous culture (CMG, technical substrate) in Ependorff 2 ml.
Vortex 10 s and then apply ultrason in an ultrasonic bath for 10 minutes and vortex again 10 s.
In 96-Well Microplate:
Dispense 180 μL of sterile Milli-Q water in 9 wells in triplicate.
In triplicate: Perform serial dilutions of 1/10th from well No. 1 (corresponding to pure sample) to well No. 10 (corresponding to dilution $10^{-9}$): take 204, and put it in 1804, sterile Milli-Q water from the following well, mix and reverse-pipette three times. Change cone between each well.
With the multi-channel pipette, spot, on PGY-agar plate, 5 μL of each dilution in duplicate.
Incubate 2 days at 45° C. (for thermophilic *Deinococcus*).
Count the number of colonies on the first countable dilution:
Average the six spots corrected by the dilution factor and multiply by 200 to get the number of CFU/mL.
TLC Protocol
Spot 5 μl of sample on TLC silica gel.
Dry spotted samples with hot air gun.
Migration of TLC in solvent Butanol/acetone/$H_2O$—4/5/1 solvent.
At the end of migration, dry TLC with hot air gun.
Reveal TLC using a solution containing 12 g ammonium molybdate+0.5 g ammonium cerium nitrate in 80 ml of $H_2SO_4$ 10%.
Enzymatic Hydrolysis and Culture
For DG01, enzymes were added to the culture medium to hydrolyze polymers into sugar monomers.
Rapeseed straw contains 40% cellulose. The enzyme loading is 0.11 g cellulase/g cellulose and 0.05 g beta-glucosidase/g cellulose. The enzyme solutions were filtered through 0.22 microns before introduction into the culture.
Preculture was done for 3 days in CMG 1%. Cell pellet was washed three times in sterile water and then used to inoculate culture medium at DOi of 0.2, i.e. ≈$10^7$ CFU/mL.
Growth was performed for 9 days at 30° C. for DRH46 and 45° C. for DG01.
Growth is controlled by a counting of bacteria according to the protocol below.
Results
The growth of DG01 was followed by counting (UFC/ml) (FIG. 1) and the consumption of sugars was estimated using TLC analysis (FIG. 2).
After 9 days, all free glucose and xylose were consumed by DG01 wt. When this consumption was reported to total sugars, it appeared that a major part of glucose and xylose was consumed. These results therefore show that the mix comprises partially digested biomass, with reduced xylose content.
Similar results are obtained with other *Deinococcus* bacteria as listed in Table 1, such as DRH01, DRH02, DRH03, and DRH46.
Cultures were lyophilized and amino-acid composition, soluble nitrogen and NDF/ADF/ADL fiber determination was carried out on dry mass.
Table 3 below compares the amino-acid composition of rapeseed straw (g/kg dry mass) to the amino-acid composition of mix of the invention (g/kg dry mass).
The results show that the mix of the invention comprises at least 20 times more amino acids than the initial rapeseed straw.

TABLE 3

Amino acids composition of the mix and rapeseed straw

|  | Mix of the invention (g/kg dry mass) | Rapeseed straw (g/kg dry mass) |
|---|---|---|
| Aspartic acid | 51.3 | 2.6 |
| Threonine | 31.9 | 1.4 |
| Serine | 18.9 | 1.4 |
| Glutamic acid | 65.1 | 3.1 |
| Proline | 26 | 1.3 |
| Glycine | 37.1 | 1.8 |
| Alanine | 46.8 | 1.8 |
| Valine | 36.2 | 1.8 |
| Cysteine | 1.6 | 0.6 |
| Methionine | 10.4 | 0.4 |
| Isoleucine | 20.6 | 1.2 |
| Leucine | 42.5 | 2.1 |
| Thyrosine | 16.1 | 0.7 |
| Phenylalanine | 19.5 | 1.4 |
| Lysine | 29.4 | 1.2 |
| Histidine | 9.7 | 0.4 |
| Arginine | 40 | 1.2 |

The mix of the invention therefore transforms a poor biological material into a rich and digestible mix for feedstuff.

Example 3: Production of a Wheat-*Deinococcus* Mix

A mix of *Deinoccocus* and wheat biomass was prepared by inoculation of *Deinococcus* strain DG01 in a medium made of whole wheat (1%, with or without Termamyl addition, and 6%) or fermentation residues (1% or 6%) supplemented with $NH_4Cl$ 20 mM and $K_2HPO_4$ 5.7 mM.
The capacity of the mixture to produce a valuable mix for feedstuff has been determined by verifying the capacity of *Deinocossus* to expand on wheat and to reduce the gluten content of wheat.
Gluten consumption was evaluated by using Enzyme Immunoassay for the quantitative determination of gliadin (soluble fraction of gluten)/gluten. This test is based on the principle of the enzyme-linked immunoabsorbent assay.
Protocol
Protein consumption is measured using a commercial kit from Libios (Ref. GLI-E02).
Sample preparation: 100 mg of finely ground lyophilized technical substrate is re-suspended in 1 ml EtOH 40%, mixed during 5 min and finally centrifuged for 10 min at 3800 rpm. The supernatant is diluted (1/500,000) in sample dilution buffer 1×.
ELISA Test:
Samples and standards are tested in duplicate.
100 μl of standards and samples are added in a 96-well microplate coated with anti-gliadin antibody.
Incubate 20 min at room temperature.
Wash wells three times with 300 μl washing solution 1×.
Add 100 μl of secondary conjugated antibody (anti-gliadin peroxidase) in empty wells.
Wash wells three times with 300 μl washing solution 1×.
Add 100 μl of TMB solution (substrate).
Incubate 20 min at room temperature, in the dark.
Add 100 μl of stop solution (color shift from blue to yellow).
Homogenize and read with a spectrophotometer at $OD_{450\ nm}$.
Result
The concentration of gliadin is directly proportional to the colour intensity of the test sample. Because of the equal amount of gliadin and gluten in wheat, the gluten concentration of the sample is calculated by multiplication with the factor 2.

Figure 3:
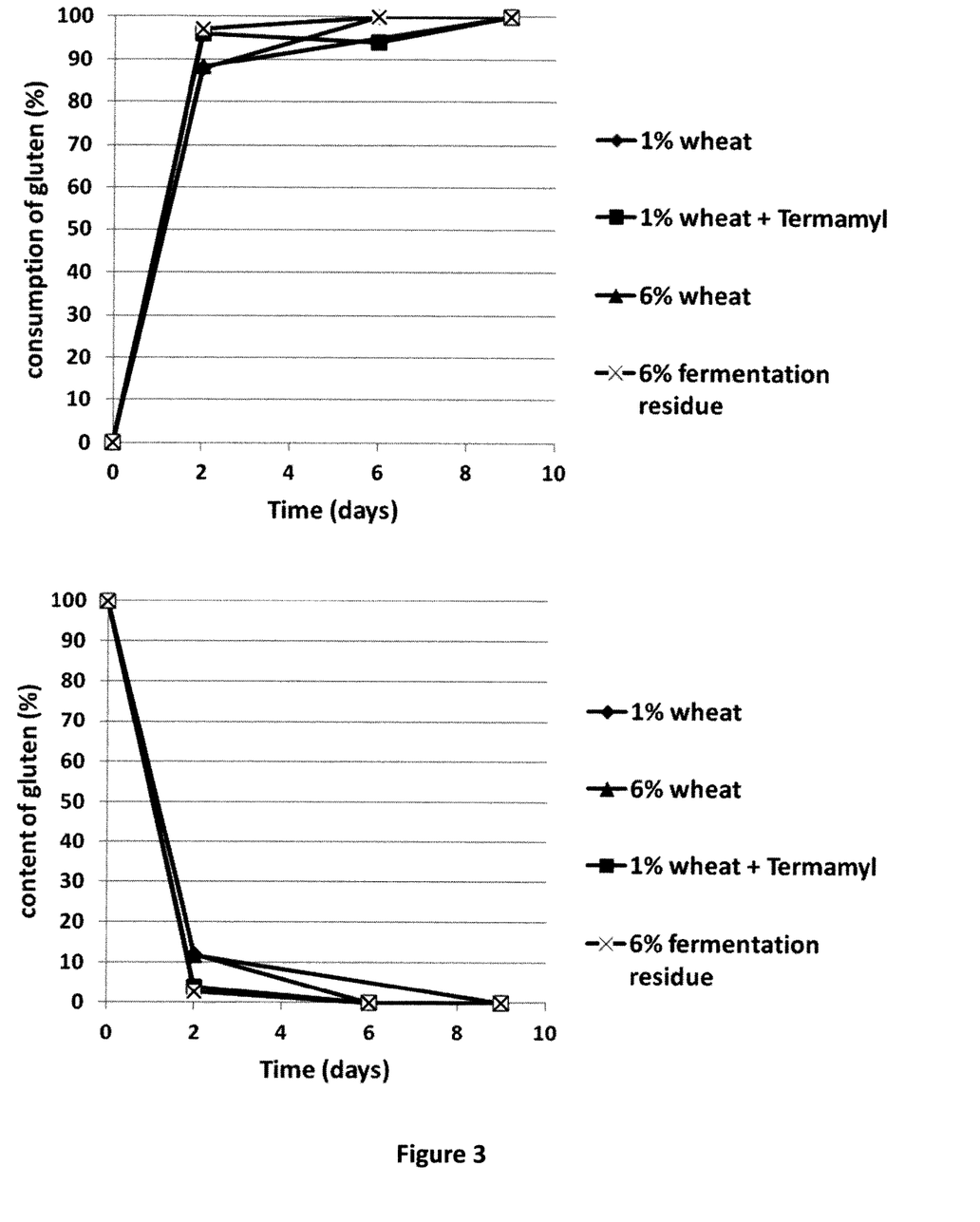
FIG. 3: Growth of strain DG01 on whole wheat (1%, with or without Termamyl, and 6%) or fermentation residues (6%) showing consumption of gluten (%) contained in the medium. Strain DG01 is able to hydrolyze gluten from whole wheat or fermentation residues.

As shown in FIG. 3, *Deinococcus* is able to hydrolyze gluten from whole wheat or fermentation residues thereof, and consume it after 2 days of growth at 45° C. After 48 h, all proteins contained in the vegetal biomasses are consumed by the *Deinococcus* strain.

Similar results are obtained with other *Deinococcus* bacteria as listed in Table 1, such as DRH01, DRH03, and DRH46.

These results therefore clearly demonstrate *Deinococcus* strains can exhibit a strong proteolytic activity resulting in a more digestible mix from wheat suitable for use in animal consumption.

Example 4: Analysis of the Amino Acid Composition of *Deinococcus* geothermalis The amino acid composition of *Deinococcus* geothermalis (strain M36-7D_21) was determined after growing the cells in a medium containing peptone and glucose as sole carbon sources. The composition was then compared to the amino acid composition of yeasts that are commonly used as a complementary protein source in fish diet and/or as a supplement in animal feed to compensate for amino acid and/or vitamin deficiencies of cereals.

Materials and Methods
Complex Medium Glucose (CMG) 1% Composition
Peptone 2 g/L;
Yeast Extract 5 g/L;
Glucose 55 mM (10 g/L);
MOPS acid 40 mM;
$NH_4Cl$ 20 mM;
NaOH 10 mM;
KOH 10 mM;
$CaCl_2.2H_2O$ 0.5 µM;
$Na_2SO_4.10H_2O$ 0.276 mM;
$MgCl_2.6H_2O$ 0.528 mM;
$(NH_4)_6(MO_7)O_{24}.4H_2O$ 3 nM;
$H_3BO_3$ 0.4 µM;
$CoCl_2.6H_2O$ 30 nM;
$CuSO_4.5H_2O$ 10 nM;
$ZnSO_4.7H_2O$ 10 nM;
D-biotin 1 µg/L;
Niacin (nicotinic acid) 1 µg/L;
Pyridoxin (pyridoxal HCl or vitamine B6) 1 µg/L;
Thiamine HCl (vitamin B1);
$FeCl_3$ 20 µM;
Sodium citrate.$2H_2O$ 20 µM; and
$K_2HPO_4$ 5.7 mM.
The final concentration of $MnCl_2$ was 5.25 µM.

Cells were grown in CMG 1% medium containing 6 µg/ml of bleomycin in a fermentor of 3.5 L at 45° C. and under agitation of 400 rpm.

About 100 to 200 ml of the culture medium were harvested by centrifugation (4000 rpm, 20 min at 4° C.) at exponential and stationary phases of growth and washed prior to lyophilisation.

The cultures were then lyophilized and amino acid composition was carried out on dry mass.

The amino acid composition and quantification were determined by HPLC.

The values of the amino acid composition of yeast extract are derived from S. Cortassa et al., 2002 "An introduction to metabolic and cellular engineering," World Scientific Publishing.

Results

Table 4 below compares the amino acid composition of *Deinococcus* geothermalis to the amino acid composition of yeast extract Quantities are given in g/100 g of dried matter.

TABLE 4

Amino acid compositions of *Deinococcus* compared to yeast extract.

| Amino acids: | Yeast extract[1] | D geothermalis Exponential Growth phase | D. geothermalis Stationary growth phase |
|---|---|---|---|
| Aspartic acid | 5.10 | 4.65 | 5.46 |
| Glutamic acid | 6.50 | 5.98 | 6.90 |
| Alanine | nd | 4.67 | 4.99 |
| Arginine§ | 0.78 | 3.92 | 4.57 |
| Cysteine | nd | 0.31 | 0.08 |
| Glycine | 2.40 | 3.05 | 3.47 |
| Histidine*§ | 0.94 | 0.93 | 1.08 |
| Isoleucine*§ | 2.90 | 1.94 | 2.23 |
| Leucine*§ | 3.60 | 4.38 | 5.23 |
| Lysine*§ | 4.00 | 2.34 | 2.70 |
| Methionine*§ | 0.79 | 1.51 | 0.44 |
| Phenylalanine*§ | 2.20 | 1.88 | 2.09 |
| Proline | nd | 2.22 | 2.55 |
| Serine | nd | 1.75 | 2.15 |
| Threonine*§ | nd | 2.82 | 3.39 |
| Tryptophane*§ | 0.88 | 0.76 | 0.79 |
| Tyrosine | 0.60 | 1.55 | 1.91 |
| Valine*§ | 3.40 | 3.31 | 3.82 |
| Total amino acids: | 34.00 | 48.00 | 54.00 |
| Proteins: | 29.45 | 41.05 | 46.19 |

§Amino acids whose carbon skeletons are not synthesized by animal cells and which are essential for fish growth (H. George Ketola 1982, *Comp biochem physiol* 73B, N°1, p17-24);
*Amino acids whose carbon skeletons are not synthesized by animal cells and which are essential for monograstric mammals;
nd not determined These data show that the total amino acid content of *Deinococcus* cells reaches 48% and 54% (g/100 g of dried matter) in the exponential and stationary growth phases, respectively. These values are higher than those obtained with yeast extract (34%) whatever the growth phase. The total *Deinococcus* protein content is also higher than that of the yeast extract. In addition, compared to the yeast extract, *Deinococcus* provides significant amount of arginine, which is an essential amino acid for fish (H. George Ketola, 1982, *Comp. Biochem. Physiol.* 73B, No. 1, pp. 17-24). *Deinococcus* biomass provides also more tyrosine and leucine compared to yeast extract, leucine being an essential amino acid for both monogastric mammals and fish.

Therefore, *Deinococcus* bacteria may be used as a source of highly valuable proteins and amino acids for feedstuff, and may even replace yeast extracts in feedstuff compositions.

Example 5: Analysis of Particular Culture Conditions

Culture Conditions Allowing Carotenoid Production

*Deinococcus* geothermalis strain MX6-1E was grown in 1 L medium containing 20 g/L peptone and 10 g/L yeast extract in a 1 L fermentor at 45° C. under 0.35 L/min air.

DO regulated at 20% by cascade control on aeration and agitation rate.

After 20 hours, the culture medium displayed a strong red color, indicating the presence of carotenoids in said culture medium.

This experimentation confirms that *Deinococcus* bacteria may produce significant amount of carotenoids. In addition, *Deinococcus* biomass provides more methionine than yeast extract when the cells are in the exponential phase of growth and methionine is an essential amino acid for animal cells and is also required for fish growth.

Culture Conditions Allowing Substantial Expansion

*Deinococcus* geothermalis strain MX6-1E-14 was grown in 1 L CMG 10% medium (as described in Example 4) containing 20 g/L glucose in a 1 L fermentor at 45° C.

In that culture condition, the optical density at 600 nm ($OD_{600\,nm}$) reaches the value 20 in 40 hours (specific growth rate being 0.5 h$^{-1}$), indicating a strong expansion of the cells.

The invention claimed is:

1. A method of feeding an animal comprising providing to the animal a feedstuff composition comprising a *Deinococcus* bacterium, wherein the animal is poultry, fish or crustacean.

2. The method of claim 1, wherein said feedstuff composition contains amino acids.

3. The method of claim 1, wherein said feedstuff composition further comprises biomass being at least partially digested by said *Deinococcus* bacterium.

4. The method of claim 3, wherein said biomass is a lignocellulosic biomass.

5. The method of claim 4, wherein the lignocellulosic biomass is cereal bran, wheat bran, vegetal cattle cake, rapeseed cattle cake, soybean cattle cake, sugar cane and derivatives thereof, corn, sugarbeet, *miscanthus*, switch grass, hemp, poplar, willow sorghum, rice, soy, peanut, cotton, lupine, *eucalyptus* or oil palm.

6. The method of claim 1, wherein the animal is fish.

7. The method of claim 1, wherein the animal is poultry.

8. The method of claim 1, wherein the animal is crustacean.

* * * * *

UNITED STATES PATENT AND TRADEMARK OFFICE
CERTIFICATE OF CORRECTION

PATENT NO. : 10,820,610 B2
APPLICATION NO. : 14/366295
DATED : November 3, 2020
INVENTOR(S) : Laure Gaufres et al.

It is certified that error appears in the above-identified patent and that said Letters Patent is hereby corrected as shown below:

In the Specification

Column 11,
Line 43, "containing MINI" should read --containing MM--.

Column 12,
Line 14, "phase, 54," should read --phase, 5µL--.
Line 15, "containing MINI" should read --containing MM--.
Line 24, "in 2004," should read --in 200µL--.
Line 26, "phase, 54," should read --phase, 5µL--.
Line 34, "in 2004," should read --in 200µL--.
Line 36, "phase, 54," should read --phase, 5µL--.
Line 43, "in 2004," should read --in 200µL--.
Line 45, "phase, 54," should read --phase, 5µL--.

Column 15,
Line 11, "take 204," should read --take 20µL--.
Line 12, "1804," should read --180µL--.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*

SEQUENCE LISTING

```
<160> NUMBER OF SEQ ID NOS: 2

<210> SEQ ID NO 1
<211> LENGTH: 23
<212> TYPE: DNA
<213> ORGANISM: artificial
<220> FEATURE:
<223> OTHER INFORMATION: primer

<400> SEQUENCE: 1
gttacccgga atcactgggc gta                                            23

<210> SEQ ID NO 2
<211> LENGTH: 23
<212> TYPE: DNA
<213> ORGANISM: artificial
<220> FEATURE:
<223> OTHER INFORMATION: primer

<400> SEQUENCE: 2
ggtatctacg cattccaccg cta                                            23
```